United States Patent
Strack

[11] B 3,981,706
[45] Sept. 21, 1976

[54] METHOD FOR MAKING FLEXIBLE COLORED FIBER OPTIC DEVICE

[75] Inventor: Richard R. Strack, Southbridge, Mass.

[73] Assignee: American Optical Corporation, Southbridge, Mass.

[22] Filed: Dec. 16, 1974

[21] Appl. No.: 532,969

[44] Published under the second Trial Voluntary Protest Program on January 13, 1976 as document No. B 532,969.

Related U.S. Application Data

[62] Division of Ser. No. 354,600, April 26, 1973, abandoned.

[52] U.S. Cl. .................... 65/3 A; 65/4 A; 65/31; 65/DIG. 7; 350/96 B
[51] Int. Cl.² .............. C03C 25/02; C03C 23/20; C03C 15/00
[58] Field of Search .......... 65/31, 4, DIG. 7, 3, 65/3 A, 4 A; 350/96 B

[56] References Cited
UNITED STATES PATENTS

| | | |
|---|---|---|
| 3,247,756 | 4/1966 | Siegmund .................. 65/DIG. 7 |
| 3,387,959 | 11/1968 | Cole .................................. 65/4 |
| 3,554,721 | 1/1971 | Gardner ........................... 65/31 |
| 3,624,816 | 11/1971 | Strack ............................. 65/31 |
| 3,690,853 | 9/1972 | Law ................................ 65/31 |
| 3,830,667 | 8/1974 | Carpenter ........................ 65/4 |

Primary Examiner—S. Leon Bashore
Assistant Examiner—Frank W. Miga
Attorney, Agent, or Firm—H. R. Berkenstock, Jr.; William C. Nealon

[57] ABSTRACT

A leached fiberscope formed of a multiplicity of optical fibers each surrounded by a stray light absorber adjacent opposite ends of the fiberscope. This light absorber is formed by adding a light-absorbing constituent to leachable overcladdings initially provided on the optical fibers which are retained adjacent opposite ends of the fiberscope as the absorber and removed from intermediate portions of the length of the fiberscope to render it flexible.

5 Claims, 2 Drawing Figures

METHOD FOR MAKING FLEXIBLE COLORED FIBER OPTIC DEVICE

This is a division of application Ser. No. 354,600 filed Apr. 26, 1973, now abandoned.

BACKGROUND OF THE INVENTION

1. Field of the Invention

Fiberscopes with particular reference to those formed of fused together optical fibers having leachable overcladdings.

2. Description of the Prior Art

In the manufacture of flexible optical fiber light and/or image conduits produced by leaching matrix glasses from between intermediate portions of the lengths of the fibers according to the techniques shown and described in U.S. Pat. Nos. 3,004,368 and 3,624,816, for example, it is a practice to retain the matrix glasses at opposite ends of the conduits. This forms permanent connections between the fibers and, in the case of image conduits which are called "fiberscopes", it keeps corresponding opposite ends of the fibers in prearranged substantially identically mosaically patterned relationships with each other.

In tightly packed bundles of fibers having clear light-conducting core and cladding components, light entering cores of the fibers at angles greater than the light acceptance angles of the particular fibers will tend to be transmitted into and through the fiber claddings and become scattered into other fibers of the bundle, eventually at least partially reaching the opposite end of the bundle as stray light. This, of course, does not contribute to reproduction of a mosaic light image being transmitted through fiber cores of the fiberscope but rather tends to wash out or reduce contrast between segments or elements of the mosaic image. The light acceptance angle or aperture angle i of an optical fiber is controlled by the indices of refraction $n_1$ of the core of the fiber and $n_2$ of a cladding joined to the core in accordance with the following equation:

$$\text{Sin } i = \sqrt{n_1^2 - n_2^2}.$$

Attempts to reduce stray light in optical fiber devices and thereby improve image definition have included a use of metallic and other opaque or semiopaque coatings on individual fibers with the defeative effect of causing an absorption of excessive amounts of useful or image-forming light. Approaches to the problem of reducing stray light in optical fiber devices with less sacrifice of image-forming light have involved the inclusion of interstitial light-absorbing filaments. These filaments are separated from the light-conducting core components of the optical fibers by the lower refractive index fiber claddings as shown and described in U.S. Pat. No. 3,247,756, for example. The interstitial light-absorbing filaments must, however, be formed of a material (e.g. glass) which is both optically and thermally compatible with all other glasses in the system. In addition to this limitation, the use of individual absorbing filaments which require a separate manufacturing operation in the making, are difficult to handle in preparing the assembly of the optical fiber bundle configuration.

Another somewhat more effective but more complicated and expensive form of absorbing interstitial element is illustrated in U.S. Pat. No. 3,387,959. This involves the addition of an outer clear cladding around each absorbing filament or the incorporation of an unclad filament into each optical fiber structure in a manner such that the filament is surrounded by a sufficient thickness of fiber cladding material to prevent its interference with image-forming light being conducted through the core part of the fibers.

The foregoing and similar prior art approaches to minimizing stray light in optical fiber image-conducting devices are relatively complicated, and uneconomical in that they require compatibility both optically and thermally of the light-absorbing elements with other glasses of the system and strategic positioning of the absorbing elements in the systems for maximum effectiveness. All of this is impractical to implement, if not inapplicable to the manufacture of image-conducting fiber optical devices by the aforementioned highly desirable, less complex and less expensive leaching technique shown and described in U.S. Pat. Nos. 3,004,368 and 3,624,816.

Accordingly, it is a principle object of the present invention to provide simple, straightforward and inexpensive means and method for minimizing stray light and its adverse effects in leached and leachable fiber optical fiberscopes and like devices.

SUMMARY OF THE INVENTION

According to the present invention, the definition or contrast of mosaic images which are conveyed by and emitted from leached image-conducting fiberscopes and like devices is improved by the addition of a light-absorbing constituent, i.e. a colorant such as manganese, to leachable overcladdings on the optical fibers. While these overcladdings are essentially completely removed throughout intermediate portions of the devices to render them flexible, they are retained adjacent opposite ends of the devices as a fiber interconnecting matrix and as a stray light absorber. Light tending to stray laterally into and through the usual low refractive index first claddings of optical fibers, upon entering one end of a fiberscope formed according to the invention, will become at least largely absorbed by the colored fiber interconnecting matrix and prevented from re-entering other fibers as stray light. Light traveling through intermediate portions of the fibers along which the over-claddings are removed, will be prevented from escaping from these portions of the fibers and/or re-entering adjacent fibers by surrounding environmental air or gases. This same light, upon reaching the emitting opposite end portion of the device will again be prevented from straying laterally from one fiber into adjacent fibers by the matrix of the colored overcladdings functioning as a stray light absorber.

The invention will be more fully understood by reference to the following detailed description taken in conjunction with the accompanying drawings.

IN THE DRAWINGS

FIG. 1 is an illustration, in perspective, of a fiberscope formed according to the present invention; and FIG. 2 is a greatly enlarged fragmentary cross-sectional view of the fiberscope taken along line 2—2 of FIG. 1.

DESCRIPTION OF THE PREFERRED EMBODIMENTS

Figure 1:
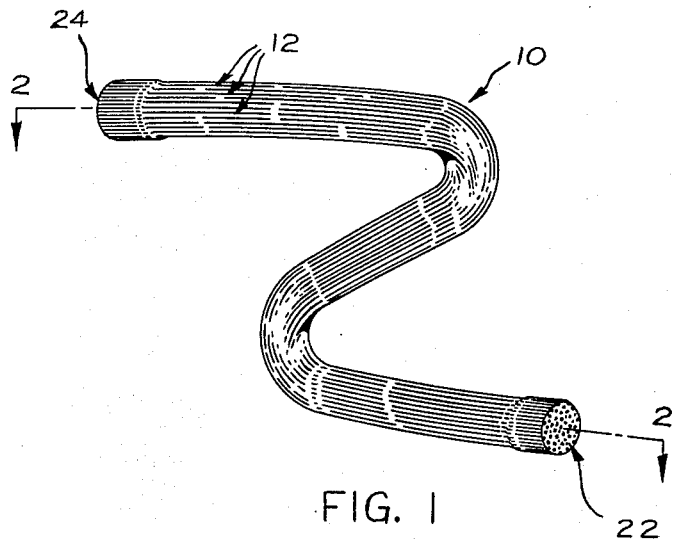

Referring to the drawings, fiberscope 10 is made up of a multiplicity of juxtaposed optical fibers 12 each having a core 14 of high refractive index material and a cladding 16 of material of lower refractive index than the core. In the manufacture of fiberscope 10, each fiber 12 is provided with an acid soluble or otherwise leachable overcladding 18 which extends initially along its entire length. Fibers 12 with overcladdings 18 are placed in side-by-side relationship with each other as a bundle and fused together by heating same to the fusing temperature of the overcladdings 18. The fusing operation may be performed simultaneously with a drawing of the bundle to reduced cross-sectional size. A protective acid-resistant covering of wax or its equivalent is next applied to opposite ends of the fused bundle whereupon the bundle is immersed in a leaching solution for a period of time sufficient to remove substantially all of the material of overcladdings 18 between the protective end portions. This renders each fiber 12 free to flex individually in the bundle and forms the flexible fiberscope.

Portions of overcladding 18 beneath the protective coverings at opposite ends of the fiberscope, which coverings are removed after the leaching operation, provide a fiber interconnecting matrix keeping corresponding opposite ends of fibers 12 permanently fixed in their originally prearranged mosaically patterned relationships. Materials useful in the fabrication of fiber optical devices such as fiberscope 10 are a high refractive index flint glass for cores 14 of fibers 12, a relatively low refractive index crown glass for claddings 16 and an acid-soluble borosilicate or lanthanum borate glass for overcladdings 18. A suitable solvent for overcladdings 18 is hydrochloric acid. Those interested in greater details of these and other materials and techniques useful in the manufacture of leached or leachable flexible fiber optic conduits or fiberscopes 10 may refer to U.S. Pat. Nos. 3,004,368 and 3,624,816.

Figure 2:
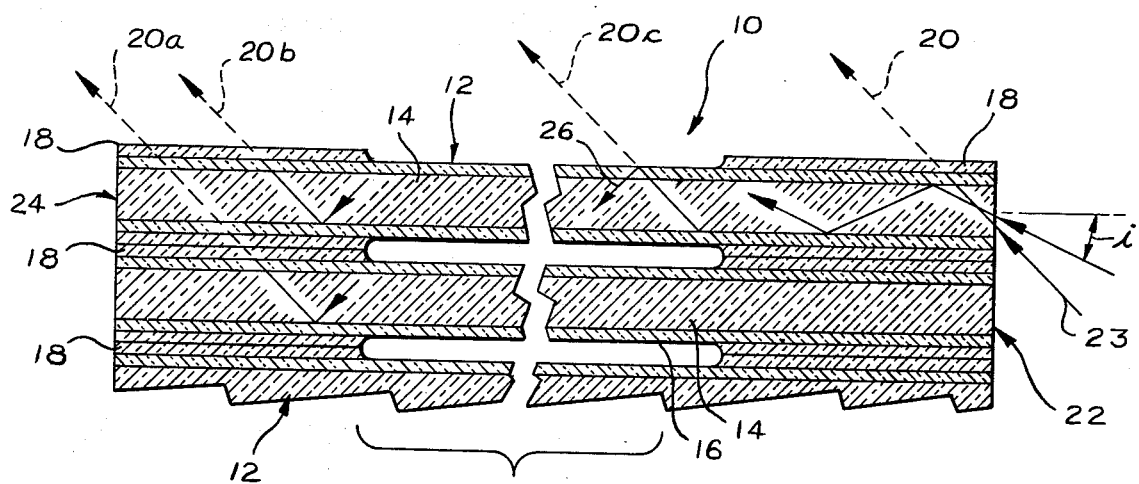

In a fiber optical device such as fiberscope 10 which has corresponding opposite ends of its fibers 12 arranged mosaically in identical geometric patterns, optical images imposed upon one end of the device will become transmitted through fibers 12 and emitted at the opposite end of the device. Actually, however, only light entering a fiber 12 within its maximum acceptance angle or numerical aperture $i$ (FIG. 2) will be conducted by total internal reflection through the fiber core 14. This angle is, of course, the half angle of a cone of light which can be conducted through the fiber core 14. Light entering the same fiber at any angle outside this cone angle will tend to pass into the fiber cladding 16 and therebeyond into adjoining fibers as illustrated by broken line 20 in FIG. 2.

The numerical aperture of a fiber 12 or system of identical fibers, e.g. fiberscope 10, may be determined from the relationship:
$$\sin i = \sqrt{n_1^2 - n_2^2}$$
where
  $n_1$ is the index of refraction of the core 14 material; and
  $n_2$ is the index of refraction of the cladding material 16.

In view of the fact that light 23 entering one end (e.g. end 22) of fiberscope 10 at an angle greater than the numerical aperture of its system will tend to escape from cores 14 of fibers 12 as illustrated by arrows 20 or 20a and enter into adjoining fibers as stray light, overcladdings 18 are rendered light-absorbant to function as traps for the stray light around claddings 16. As mentioned heretofore, stray light does not contribute to the reproduction of a mosaic light image simultaneously being transmitted through cores 14 of fibers 12 but rather tends to wash out or reduce the contrast of the mosaic image.

The matrix of overcladdings 18 at opposite ends of fiberscope 10 are rendered light-absorbant by the addition of a light-absorbing constituent to their batch composition prior to its application to fibers 12. In this respect, a desirable composition for overcladdings 18, employing manganese as the light-absorbing constituent, is as follows:
  7.6% (by weight) lanthanum oxide ($La_2O_3$)
  44.65% (by weight) boron trioxide ($B_2O_3$)
  42.75% (by weight) barium oxide (BaO)
  5.00% (by weight) manganese ($MnO_2$)

Fiberscope 10 having fused overcladdings 18 which function both as a fiber interconnecting matrix and as a stray light absorber operate as follows:

Light entering fibers 12 within their respective aperture angles $i$ is conducted therethrough by total internal reflection as image forming light. Other light entering the image receiving end 22 of fiberscope 10 at angles greater than aperture angle $i$ (as illustrated by arrow 24) and tending to stray outwardly of the particular fiber 12 upon which this light impinges (as illustrated by arrow 20) enters into the matrix of light-absorbing overcladdings 18 to become absorbed thereby and prevented from appreciable further transmission through fiberscope 10 as stray light.

Throughout the portions of fibers 10 between overcladdings 18, light tending to stray outwardly from one or more fiber cores 14 (as illustrated by arrow 20c) will normally inherently be reflected back into fiber 12 (as indicated by arrow 26) as a result of the very low refractive index of air or other gaseous environments normally surrounding fibers 12. Other light, upon reaching the proximity of end 24 of fiberscope 10 and still tending to escape outwardly of fibers 12 (as illustrated by arrow 20b) will, at this end of the fiberscope, become absorbed by the matrix of overcladdings 18 and prevented from interferring with image-forming light being emitted from cores 14 of fibers 12.

From the foregoing, it can be seen that the light-absorbing fiber-interconnecting matrix of overcladdings 18 adjacent ends 22 and 24 of fiberscope 10 and air or gases normally surrounding fibers 12 throughout intermediate portions of the fiberscope minimize stray light and its tendency to wash out or reduce contrast between segments or elements of mosaic images being transmitted by the fiberscope.

The embodiment of the invention described hereinabove for purposes of illustration is not to be interpreted as restrictive of the invention beyond that necessatated by the following claims. Those skilled in the art will readily appreciate that various modifications and adaptations of the precise form hereshown may be made to suit particular requirements.

I claim:
1. The method of forming a flexible fiber optic image-transmitting conduit comprising the steps of:
  preparing a composition of leachable glass containing a light-absorbing colorant;
  overcladding each of a multiplicity of long and thin glass clad glass optical fibers with said colored leachable glass, said overcladding in each case of each fiber comprising a second fiber cladding;
  arranging said overclad optical fibers in intimately juxtaposed relationships with each other;
  heating and fusing said overcladdings together as a matrix between said optical fibers;

leaching said matrix away from said optical fibers throughout a substantial portion of their lengths intermediately of corresponding opposite ends thereof while leaving an appreciable amount of said matrix adjacent each of said opposite ends of said fibers as fiber interconnecting and stray light-absorbing means.

2. The method according to claim 1 wherein said step of leaching said matrix is performed by exposing same to an acid.

3. The method according to claim 2 wherein said composition of leachable glass includes manganese as said colorant.

4. The method according to claim 2 wherein said composition of colored leachable glass consists essentially of the following ingredients in the following approximate proportions:

7.6% (by weight) lanthanum oxide ($La_2O_3$)
44.65% (by weight) boron trioxide ($B_2O_3$)
42.75% (by weight) barium oxide (BaO)
5.00% (by weight) manganese ($MnO_2$).

5. The method according to claim 1 further including the step of drawing said juxtaposed fibers longitudinally as a unit to a reduced cross-sectional size during said step of heating and fusing said overcladdings.

* * * * *